United States Patent
Walker et al.

(10) Patent No.: US 9,961,052 B2
(45) Date of Patent: May 1, 2018

(54) VIRTUALIZED HOST ID KEY SHARING

(71) Applicant: Extreme Networks, Inc., San Jose, CA (US)

(72) Inventors: William T. Walker, Evergreen, CO (US); Aabha Biyani, Nanded (IN)

(73) Assignee: Extreme Networks, Inc., San Jose, CA (US)

( * ) Notice: Subject to any disclaimer, the term of this patent is extended or adjusted under 35 U.S.C. 154(b) by 960 days.

(21) Appl. No.: 13/930,308

(22) Filed: Jun. 28, 2013

(65) Prior Publication Data
US 2015/0007270 A1   Jan. 1, 2015

(51) Int. Cl.
*H04L 29/06* (2006.01)
*G06F 21/10* (2013.01)
*G06F 9/455* (2018.01)

(52) U.S. Cl.
CPC .......... *H04L 63/06* (2013.01); *G06F 9/45558* (2013.01); *G06F 21/10* (2013.01); *H04L 63/10* (2013.01); *G06F 2009/45562* (2013.01)

(58) Field of Classification Search
CPC .......... H04L 63/06; H04L 63/10; G06F 21/10
USPC ............................................................ 726/4
See application file for complete search history.

(56) References Cited

U.S. PATENT DOCUMENTS

| | | | |
|---|---|---|---|
| 8,522,015 B2* | 8/2013 | Goldsmid | G06F 21/53 705/59 |
| 8,528,059 B1* | 9/2013 | Labana et al. | 726/5 |
| 2002/0188869 A1* | 12/2002 | Patrick | G06F 21/6245 726/4 |
| 2005/0027871 A1* | 2/2005 | Bradley | G06Q 20/1235 709/227 |
| 2005/0138423 A1* | 6/2005 | Ranganathan | 713/201 |
| 2006/0218544 A1* | 9/2006 | Chakraborty | G06F 8/63 717/168 |
| 2007/0180493 A1* | 8/2007 | Croft et al. | 726/2 |
| 2009/0328225 A1 | 12/2009 | Chanbers et al. | |
| 2010/0082991 A1* | 4/2010 | Baldwin | H04L 9/083 713/176 |
| 2010/0205303 A1 | 8/2010 | Chaturvedi et al. | |

(Continued)

FOREIGN PATENT DOCUMENTS

GB        2409310        6/2005

OTHER PUBLICATIONS

TechTerms, "Whitelist [definition]", Updated: Sep. 29, 2010, Sharpened Productions, entire page, http://techterms.com/definition/whitelist.*

(Continued)

*Primary Examiner* — Luu Pham
*Assistant Examiner* — Ronald Baum
(74) *Attorney, Agent, or Firm* — Haley Guiliano LLP

(57) ABSTRACT

In virtualized environments a method of determining authorization to a resource cannot use a hardware specific identifier, such as a MAC address. As a result upgrading a virtual host may cause licenses associated with that host to be invalid, even though the upgraded virtual host should be authorized. Authentication methods and systems are disclosed such that a key may be shared with a second host along with a license file and, provided at least the second host has a key associated with its system identifier and a key associated with a license file, access to a licensed resource may be authorized.

17 Claims, 2 Drawing Sheets

(56) References Cited

U.S. PATENT DOCUMENTS

| | | | | |
|---|---|---|---|---|
| 2011/0277027 A1* | 11/2011 | Hayton | ............... | H04L 63/0884 |
| | | | | 726/8 |
| 2013/0227303 A1* | 8/2013 | Kadatch | ................ | G06F 21/554 |
| | | | | 713/193 |
| 2014/0007197 A1* | 1/2014 | Wray | .................. | G06F 21/6218 |
| | | | | 726/4 |

OTHER PUBLICATIONS

SAS Institute Inc., 'Moving SAS® Applications from a Physical to a Virtual VMware Environment', Apr. 2015, SAS Institute Inc., entire document, https://support.sas.com/resources/papers/MovingVirtuaVMware.pdf.*

Oracle Corp., 'Migration from VMware to Oracle VM—A Case Study', Nov. 2015, Oracle and/or its affiliates, entire document, http://www.oracle.com/us/products/consulting/resource-library/migration-vmware-oracle-vm-2778441.pdf.*

Extended Search Report for European Patent Application No. 14174827.7, dated Sep. 17, 2015 7 pages.

* cited by examiner

VIRTUALIZED HOST ID KEY SHARING

FIELD OF THE DISCLOSURE

The present disclosure is generally directed toward license keys and more particularly, maintaining usable license keys when a virtual machine is updated.

BACKGROUND

Copy-protection of software applications is one of the important concerns of any software vendor. In order to prevent unauthorized copying, or at least make it more difficult, many systems look at certain attributes, such as a host identification key ("host ID") and compare it to a license file. If the host ID is authorized, the software executes. If the Host ID doesn't match, the operator of the system needs to acquire an appropriate license corresponding to the system in order for the software to work.

Prevention of unauthorized copying becomes more problematic in virtual environments where the host ID changes but not due to an event that would terminate the authorization granted by the license. Utilization of a media access control ("MAC") address is useful, provided one has access to the physical device hosting the software. Virtual machine ("VM") pose a problem to MAC address authentication since they do not have access to the physical machine or, if access is provided, it is not consistent as the underlying hardware may change.

As a result, a data center running an application on a virtual machine may be authorized to use a particular software application. An upgrade to the VM may cause the host ID to change. Once changed, any licenses that are verified against a previous host ID will cause the associated software or features to be unable to verify the license with the upgraded host ID and may cause the software to stop operating. Similarly, redundant license servers may host a single license file containing the host IDs for all the systems supported. The file must be maintained with current host IDs and licenses referencing the current host IDs. When a host ID changes, the administrative burden can be substantial. After an upgrade, the operator of the VM or licensing server supporting a VM, must contact the vendor and obtain a new license file. Until the updated license file is obtained, the software may be inoperable.

SUMMARY

It is with respect to the above issues and other problems that the embodiments presented herein were contemplated.

By creating a handshake to pass the host ID from one system to another, one system may receive authorization for a license using another host's host ID. As such a pre-upgraded VM may then authorize a post-upgraded VM, a primary license server may authorize a redundant license server, or any other authorized first machine may authorize a trusted second machine via the first machine's host ID.

Various embodiments are disclosed herein. In one embodiment, a method of sharing a virtualized host access key is disclosed. The method comprising: having a first host, operable to access a resources upon being authorized and whereby the authorization includes determining that a first host key associated with the identity of the host is associated with a license repository; creating a second host with a second host key; copying the first host key and license repository to a second host; receiving by the second host a request to access the resource; denying the request to access the resource by the second host until the second host has been authorized; and authorizing the second host to access the resource upon (a) determining that the second host key is associated with a known system identifier of the second host, (b) determining that the second host has the first host key, and (c) determining the first host key is associated with the license repository copied to the second host.

In another embodiment, a system is disclosed, comprising: a first host image, further comprising: a first host system identifier; a first host key; a first license repository; and a resource, accessible to the first host with authorization; a second host, further comprising: a second host system identifier; and a second host key; a copying mechanism, operable to: access the first host image and the second host; copy the first host key, from the first host image, to the second host; and copy the first license repository, from the first host image, to the second host; and an access controller, operable to authorize access to at least one of the first host and second host.

In yet another embodiment, a method of managing access to a resource in a computing system is disclosed, comprising: receiving a request to access the resource on a host; and granting access to the resource by the host upon determining, (a) the host has a first key in accord with a record in a license repository and (b) the host has a second key in accord with a system identifier of the host.

The term, "virtual machine" or "VM," as used herein, refers to a virtualized machine that emulates a server or other computing hardware.

The terms "has," "contains," "within," and the like, are not limited to a physical or logical containment or integration of one thing into or with another. As used herein, such terms may be used to convey one embodiment, such as integration or attachment, but do not exclude accessing and/or controlling another component. As one example, a phrase such as, "a computer has a storage device," shall also mean, "a computer has access to a storage device." As a second example, a phrase such as, "a computer executes a program," shall also mean, "a computer causes a program to execute."

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
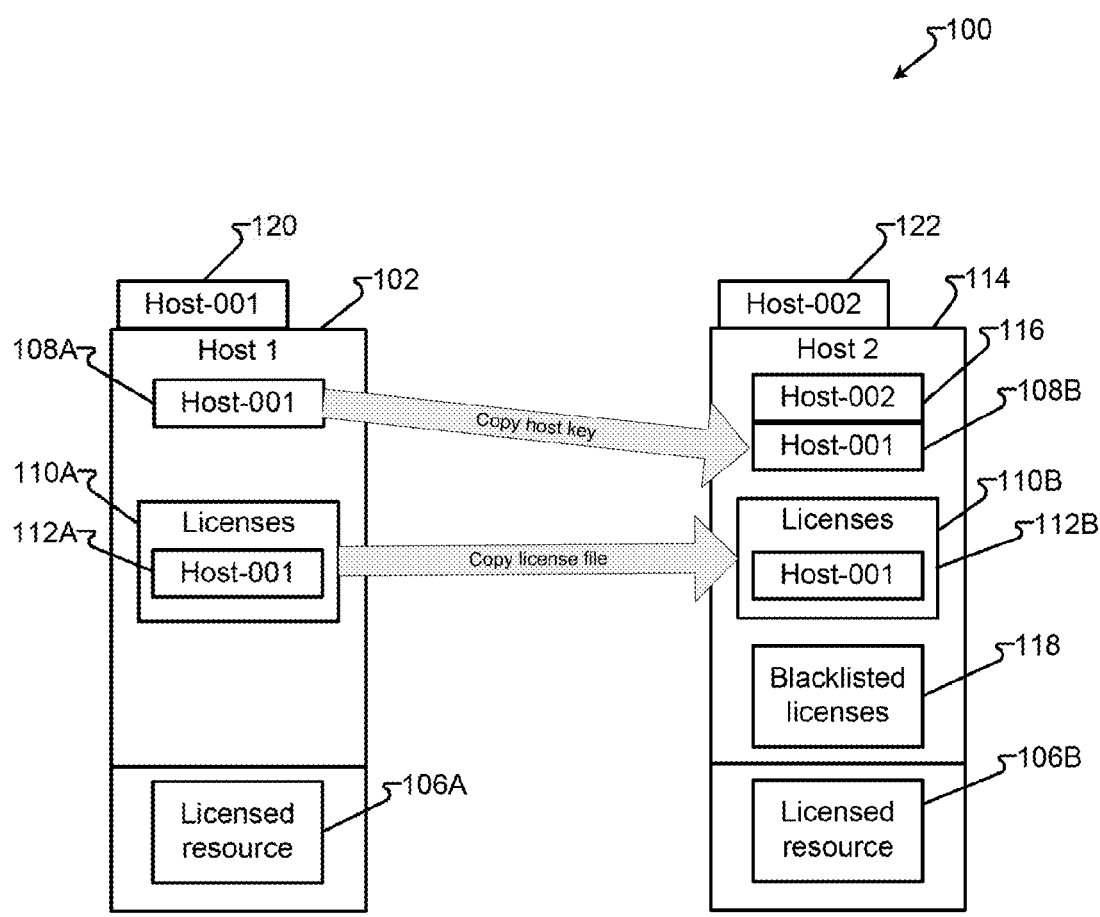
FIG. 1 illustrates a block diagram of two virtual hosts in accordance with the embodiments of the present disclosure.

FIG. 1 illustrates block diagram 100 of two virtual hosts, host 1 (102) and host 2 (114) in accordance with the embodiments of the present disclosure. Host 1 (102) and host 2 (114) are variously embodied and may comprise a virtual environment, VM, and/or components thereof, such as a licensing manager and/or system manager. The embodiments herein may be primarily directed towards host performing all activities (e.g., executing a resource, running services to control access, looking up records in a repository, and the like). However, one of ordinary skill in the art will appreciate that offloading certain processes or accessing or sending information to another component embodiments are common variations of system designs. Such variations are also contemplated by the embodiments described herein.

In one embodiment, host 1 (102) has license file 110A with license key 112A. Upon determining that host 1 (102) has host key 108A, which matches license key 112A, licensed resource 106A may be accessed on host 1 (102).

Licensed resource 106A may be any computing resource (e.g., hardware, virtual hardware, software, and/or data or portions thereof) available to host 1 (102). In a further embodiment, accessing licensed resource 106A may also include, executing, retrieving, storing or other operation of a resource. Access to licensed resource 106A by an unauthorized host may be denied completely or in part, whereby certain features or portions are available to the host and other features or options are not available. In a further embodiment, access to licensed resource 106A by an unauthorized host may cause the licensed resource to operate in an impaired manner (e.g., demonstration or "demo" mode) as compared to operations available to a licensed host.

It is common practice to perform upgrades on a virtual host by creating a second virtual host with the upgrades. The system identity of the first and second hosts is similar or may be identical. The previous host may then be shut down or otherwise rendered inoperable. For example, upgrading a virtual machine in a VMware environment may be performed by a "move" operation where the identity of the host is maintained. The "move" operation takes the virtual machine from one location and creates it in another. Although the "move" may not, or not immediately, remove the original host, the original host is substantially deactivated and/or unavailable. In one embodiment, the system identity is determined by a universally unique identifier ("UUID"), Internet Protocol address ("IP address"), a combination thereof, and/or a hash thereof. Additionally, a timestamp may also be incorporated into an identifier.

In another embodiment, host 1 (102) has a unique system identifier, system identifier 1 (120) by which host 1 (102) is known by the system, such as a VMware environment. Similarly, host 2 (114) also has a unique system identifier, system identifier 2 (122).

In one embodiment, diagram 100 represents an operation whereby host 1 (102) becomes host 2 (114) and upgrades applied but with access to licensed resource 106B preserved. In another option host 1 (102) may be offline, such as a backup image, or new installation. In yet another embodiment, host 1 (102) is a primary host and host 2 (114) is secondary host. In still another embodiment, host 1 (102) is an active host and host 2 (114) is a standby host.

Host 2 (114) receives host key 108B and license file 110A, with license key 112A, from host 1 (102), and may be created such that it is known by a different identifier than what is associated with the license file (e.g., the UUID is identical but the IP address is different). It should be noted that the example host identifiers used herein (e.g., "Host-001") are intended to represent an actual identifier and not define or limit the actual values of a host identifier.

In one embodiment, host 1 (102) is the host originally licensed to licensed resource 106A. If host 1 (102) attempts to access licensed resource 106A, it must be determined if host 1 (102) is authorized. An application controlling access to licensed resource 106A accesses license file 110A and finds license key 112A. The value of license key 112A (e.g., "Host-001") matches system identifier 1 (120). As a result, it can be concluded that host 1 (102) is authorized to access licensed resource 106A. In another embodiment host key 108A may be compared to license key 112A and/or system identifier 1 (120) to determine authorization to licensed resource 106A.

Verifying host 2 (114) as authorized to access licensed resource 106B, in a manner described above in relation to host 1 (102) accessing licensed resource 106A, would fail. License file 110B having license key 112B no longer matches system identifier 122. Therefore, as host 2 (144) is authorized to access licensed resource 106B, a different authentication procedure is used.

In one embodiment, a resource operable to authorize host 2 (114) to access licensed resource 106B determines that a key, in particular system key 116, matches system identifier 2 (122). As they match, a second test is performed whereby license key 112B is compared to a key, in particular host key 108B and they match. As a result, host 2 (114) is authorized to access licensed resource 106B.

In another embodiment, whereby no key (e.g., neither of host key 108B nor system key 116) associated with host 2 (114) matches system identifier 2 (122), then host 2 (114) is not authorized to access licensed resource 106B. In a further embodiment, system key 116 and/or primary key 108B are added to blacklist 118. In a still further embodiment, authorizing host 2 (114) to access licensed resource 106B causes system key 116 and/or primary key 108a key to be compared to entries in blacklist 118. If such an entry is found, authorization is denied. In a further embodiment, all license keys are removed and/or otherwise identified as invalid.

Figure 2:
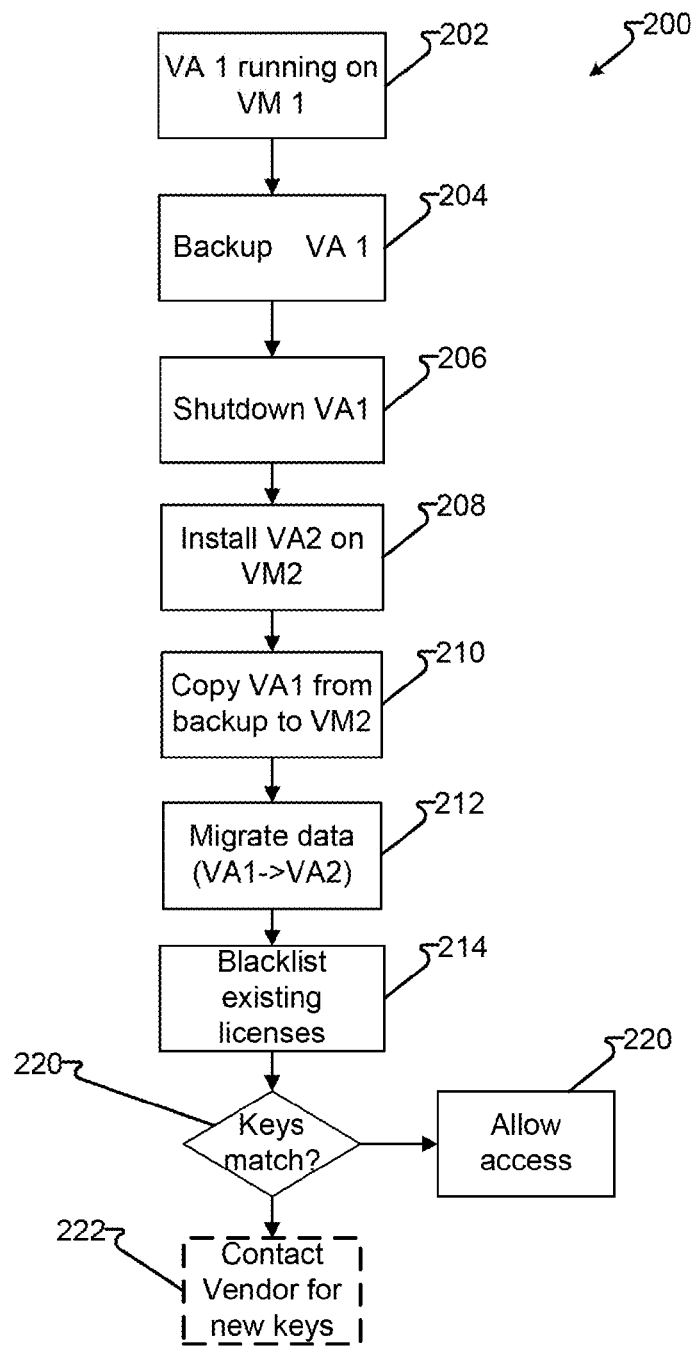
FIG. 2 illustrates a flowchart in accordance with the embodiments of the present disclosure.

FIG. 2 illustrates flowchart 200 in accordance with the embodiments of the present disclosure. A Virtualized Application ("VA") has used herein is an application running in a VM or other virtualized environment. With respect to the embodiments illustrated in FIG. 2, the VA has and/or accesses the licensed resource.

In one embodiment, step 202 is the execution of a VA on a first virtual machine, such as host 1 (102). Step 204 creates a backup image of VA 1. In another embodiment, step 202 is omitted such as when step 204 is creates a backup image from a master, such as a new installation.

Step 206 optionally shuts down VA 1. In other embodiments, step 206 is omitted or modified, such as when step 206 leaves VA 1 operational when VA 1 is only being de-authorized to access a licensed resource (e.g., licensed resource 106A).

Step 208 installs VA 2 on VM2 and otherwise enables VA 2 to be able to be operational. Step 210 then copies the VA 1 from backup to VM 2, such as license file 110 and primary host key 108. Data migration from VA 1 to VA 2 may be performed by step 212.

Step 214 blacklists all existing licenses. Licenses keys may need to be verified. If so, then in one embodiment, one or more licenses keys are hashed from the UUID and/or IP Address. In a further embodiment, additional decrypting of the license keys may be employed when encrypted. Then, in step 220 if the keys match (such as license key 112B matching primary host key 108B and system key 116 matching system identifier 1 (122), access to the resource may be allowed by step 220. Optionally, if step 220 fails, the vendor or other authorized party may be contacted for the generation of new keys.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function, to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of sharing a virtualized host access key, comprising:

having a first host, operable to access a resource upon being authorized and whereby the authorization includes determining that a first host key associated with the identity of the first host is associated with a license repository, wherein the first host is configured to provide a virtualized computing environment;

creating a second host with a second host key, wherein the second host is configured to provide a virtualized computing environment;

copying the first host key and license repository to a second host;

receiving by the second host a request to access the resource;

denying the request to access the resource by the second host until the second host has been authorized; and authorizing the second host to access the resource upon (a) determining that the second host key is associated with a known system identifier of the second host, (b) determining that the second host has the first host key, and (c) determining the first host key is associated with the license repository copied to the second host.

2. The method of claim 1, wherein the step of authorizing further includes (d) determining the first host key is not associated with a blacklisted license.

3. The method of claim 1, wherein the step of authorizing further includes (d) determining the second host key is not associated with a blacklisted license.

4. The method of claim 1, wherein at least one of the first host key and the second host key comprises a universally unique identifier and an IP address.

5. The method of claim 4, wherein at least one of the first host key and the second host key further comprises a timestamp.

6. The method of claim 1, wherein at least one of the first host key and the second host key is encrypted.

7. The method of claim 1, further comprising, generating the second host key from a system identifier of the second host.

8. The method of claim 1, further comprising, upon determining the second host key is not associated with the known system identifier of the second host (a) not authorizing access to the resource; (b) copying the first host key, the second host key, and any additional host keys to a blacklist; (c) deleting all keys, and (d) updating the second host key to be associated with the known system identifier of the second host.

9. The method of claim 1, further comprising:

generating the second host key from, at least, indicia of the first and second host; and upon generating the second host key, the first host key is disassociated with the license repository on the first host.

10. The method of claim 1, wherein determining further comprises, determining at least one of (a) determining equality of values, (b) determining equality of hashed values, and (c) determining equality of decrypted values.

11. A system, comprising:

a first host image of a host, wherein the first host is configured to provide a virtualized computing environment, further comprising:
  a first host system identifier;
  a first host key;
  a first license repository; and
  a resource, accessible to the first host with authorization;

a second host, further comprising:
  a second host system identifier; and
  a second host key;

a copying mechanism, operable to:
  access the first host image and the second host;
  copy the first host key, from the first host image, to the second host; and
  copy the first license repository, from the first host image, to the second host; and an access controller, operable to authorize access to at least one of the first host and second host.

12. The system of claim 11, whereby:

the access controller grants access to the second host to the resource upon determining (a) the second host key and the second host system identifier agree; (b) the second host has the first host key; and (c) the first license repository on the second host contains a record in agreement with the first host key of the second host.

13. The system of claim 12 further comprising:

a blacklist, comprising a number of records of banned host identifiers; and wherein the access controller granting access upon (d) determining the second host key is not associated with any record of the blacklist.

14. The system of claim 12 further comprising:

a whitelist, comprising a number of records of permitted host identifiers; and wherein the access controller granting access upon (d) determining the second host key is associated with a record of the whitelist.

15. The system of claim 11, further comprising:

a key generator, operable to create the second host key from the first host image and the second host; and expiring the first host key.

16. The system of claim 11, wherein the first host image resides on a backup.

17. The system of claim 11, wherein the first host image resides on an active host.

* * * * *